US 11,928,448 B2

United States Patent
Prashanth et al.

(10) Patent No.: US 11,928,448 B2
(45) Date of Patent: Mar. 12, 2024

(54) SYSTEM AND METHOD FOR DEVELOPMENT AND DISTRIBUTION OF MOBILITY SOLUTIONS

(71) Applicants: Robert Bosch GmbH, Stuttgart (DE); Bosch Limited, Bangalore (IN)

(72) Inventors: Anantha Prashanth, Bangalore (IN); Ramachandra Pradeep, Bangalore (IN)

(73) Assignees: Robert Bosch GmbH, Stuttgart (DE); Bosch Limited, Bangalore (IN)

(*) Notice: Subject to any disclaimer, the term of this patent is extended or adjusted under 35 U.S.C. 154(b) by 0 days.

(21) Appl. No.: 17/753,124

(22) PCT Filed: Jul. 16, 2020

(86) PCT No.: PCT/EP2020/070121
§ 371 (c)(1),
(2) Date: Feb. 18, 2022

(87) PCT Pub. No.: WO2021/032372
PCT Pub. Date: Feb. 25, 2021

(65) Prior Publication Data
US 2022/0326923 A1 Oct. 13, 2022

(30) Foreign Application Priority Data
Aug. 21, 2019 (IN) .............................. 201941033652

(51) Int. Cl.
*G06F 8/41* (2018.01)
*G06F 8/10* (2018.01)
*G06F 8/38* (2018.01)

(52) U.S. Cl.
CPC ............... *G06F 8/447* (2013.01); *G06F 8/10* (2013.01); *G06F 8/38* (2013.01)

(58) Field of Classification Search
CPC ............... G06F 8/447; G06F 8/10; G06F 8/38
(Continued)

(56) References Cited

U.S. PATENT DOCUMENTS

| 6,289,382 B1 * | 9/2001 | Bowman-Amuah ... H04L 67/01 709/226 |
| 6,477,580 B1 * | 11/2002 | Bowman-Amuah ..... G06F 9/54 709/236 |

(Continued)

FOREIGN PATENT DOCUMENTS

IN 256171 5/2013

OTHER PUBLICATIONS

Puri, Shammy, and Alice Aureli. "Transboundary aquifers: a global program to assess, evaluate, and develop policy." Groundwater 43.5 (2005): pp. 661-668. (Year: 2005).*

(Continued)

*Primary Examiner* — Satish Rampuria
(74) *Attorney, Agent, or Firm* — Maginot, Moore & Beck LLP

(57) ABSTRACT

A system provides a framework/platform for development and distribution of solutions related to vehicles. A processor is configured to render a plurality of modules in at least one terminal device based on an access request. The plurality of modules is displayable on a display interface of the at least one terminal device. The processor is further configured to execute instructions generated from the plurality of modules for development of the solutions. The instructions are generated by a user of the at least one terminal device, which is in communication with a server. The plurality of modules is accessible through an input unit of the at least one terminal device, each of the plurality of modules is usable alone and in combination. The processor stores the developed solutions in the server for distribution.

19 Claims, 2 Drawing Sheets

Figure 1:
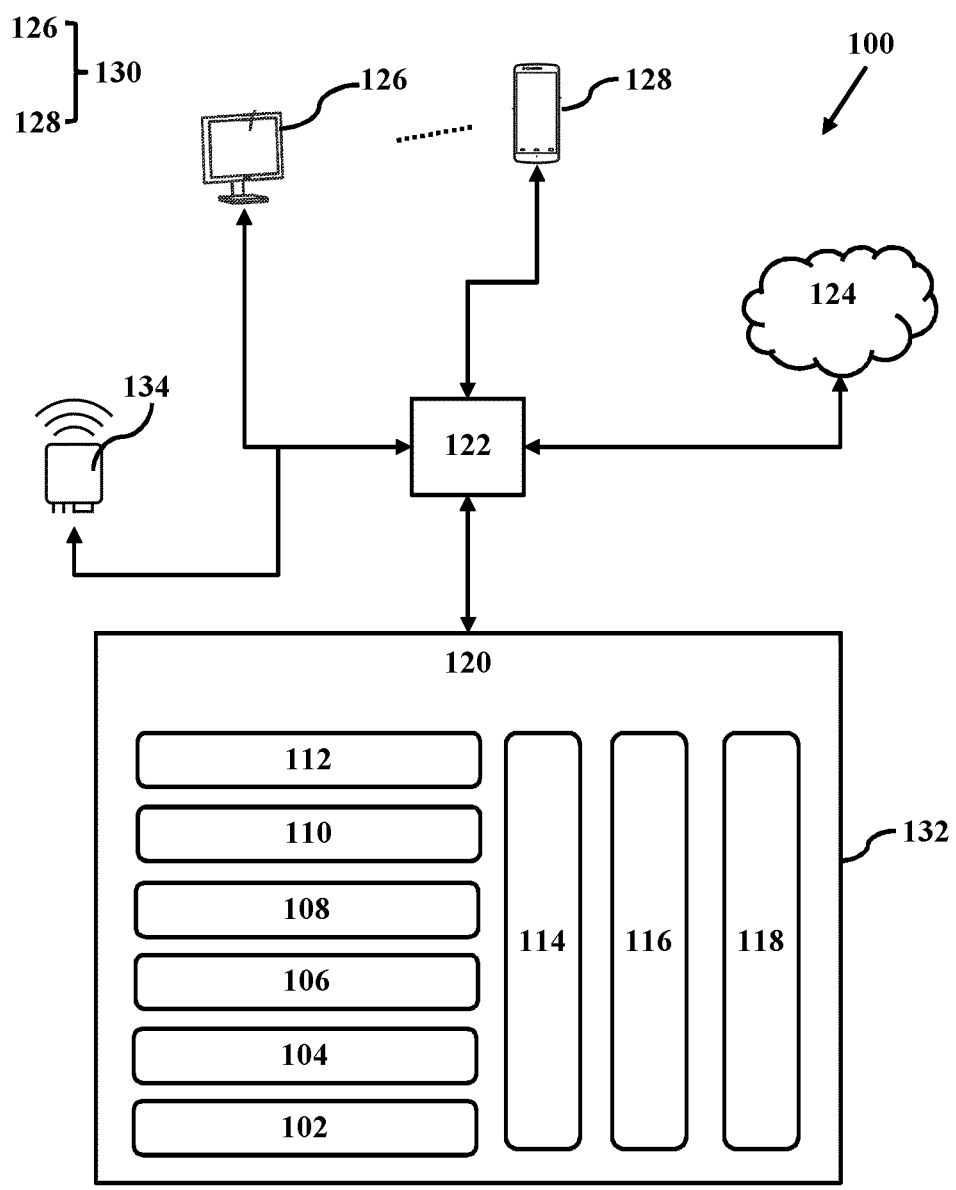

(58) Field of Classification Search
USPC .................................................. 717/120–168
See application file for complete search history.

(56) References Cited

U.S. PATENT DOCUMENTS

| | | | | | |
|---|---|---|---|---|---|
| 2001/0032154 | A1* | 10/2001 | Schummer | ............. | G06Q 30/06 |
| | | | | | 705/30 |
| 2003/0120557 | A1* | 6/2003 | Evans | ................ | G06Q 30/0601 |
| | | | | | 705/26.1 |
| 2004/0117759 | A1* | 6/2004 | Rippert, Jr. | ............... | G06F 8/20 |
| | | | | | 717/113 |
| 2008/0126785 | A1* | 5/2008 | Chong | .................. | G06F 9/4401 |
| | | | | | 713/1 |
| 2014/0282357 | A1* | 9/2014 | Padaliak | ................... | G06F 8/71 |
| | | | | | 717/122 |
| 2019/0386923 | A1* | 12/2019 | Ingerman | .......... | H04W 28/0289 |

OTHER PUBLICATIONS

Ma, Xiaolei, Edward D. McCormack, and Yinhai Wang. "Processing commercial global positioning system data to develop a web-based truck performance measures program." Transportation Research Record 2246.1 (2011): pp. 92-100. (Year: 2011).*

Quezada-Sarmiento, Pablo-Alejandro, Liliana Enciso, and Juan Garbajosa. "Use of body knowledge and cloud computing tools to develop software projects based in innovation." 2016 IEEE Global Engineering Education Conference (EDUCON). IEEE, 2016.pp. 267-272 (Year: 2016).*

Wu, Gang, Mitsuhiko Mizuno, and Paul JM Havinga. "MIRAI architecture for heterogeneous network." IEEE Communications Magazine 40.2 (2002): pp. 126-134. (Year: 2002).*

Manzalini, Antonio, et al. "Clouds of virtual machines in edge networks." IEEE Communications Magazine 51.7 (2013): pp. 63-70. (Year: 2013).*

Marquez-Barja, Johann M., et al. "Virtualizing testbed resources to enable remote experimentation in online telecommunications education." 2015 IEEE Global Engineering Education Conference (EDUCON). IEEE, 2015.pp. 836-843. (Year: 2015).*

International Search Report corresponding to PCT Application No. PCT/EP2020/070121, dated Oct. 19, 2020 (English language document) (3 pages).

\* cited by examiner

SYSTEM AND METHOD FOR DEVELOPMENT AND DISTRIBUTION OF MOBILITY SOLUTIONS

This application is a 35 U.S.C. § 371 National Stage Application of PCT/EP2020/070121, filed on Jul. 16, 2020, which claims the benefit of priority to Serial No. IN 201941033652 (pending), filed on Aug. 21, 2019 in India, the disclosures of which are incorporated herein by reference in their entirety.

FIELD OF THE INVENTION

The present invention relates to a system and method for development and distribution of vehicle mobility solutions.

BACKGROUND OF THE INVENTION

According to a patent 256171, a distributed development environment for building internet applications by developers at remote locations is disclosed. Developing Internet-hosted business applications composed of web services and software for use in such environments where applications and application components interoperate to perform requested business functions. The invention utilize a software development application services provider module (DASP), an Instantiator module, a Builder module, an Applications Service Provider (ASP) Infrastructure Platform (AIP) module, and a hosted production environment module. Developers and testers situated in diverse locations so that a larger pool of skilled people can be employed, the work can be done around the clock by using people all over the globe, and the costs can be reduced by directing work to people in countries with lower labor rates. The system and method of the present invention increases efficiencies and reduces costs to all parties by partnering the developers with third parties who are brought in at the beginning of development.

BRIEF DESCRIPTION OF THE ACCOMPANYING DRAWINGS

Figure 2:
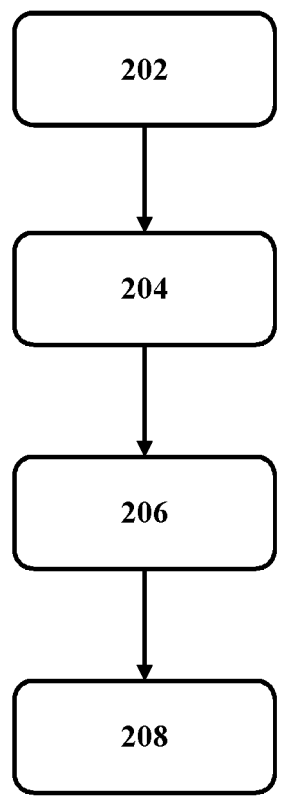

An embodiment of the disclosure is described with reference to the following accompanying drawing, FIG. 1 illustrates a block diagram of a system for development and distribution of mobility solutions, according to an embodiment of the present invention, and FIG. 2 illustrates a method for developing and distributing of mobility solutions, according to the present invention.

DETAILED DESCRIPTION OF THE EMBODIMENTS

FIG. 1 illustrates a block diagram of a system for development and distribution of mobility solutions, according to an embodiment of the present invention. The system 100 comprises a server 124 or cloud, at least one terminal device 130 connectable to the server 124 through at least one of a wired connection and/or a wireless connection, and at least one processor 122. The processor 122 establishes a communication between the server 124 and at least one of the terminal device 130 after an authentication. The wired connection refers to Local Area Network (LAN), Universal Serial Bus (USB) based connection and other similar cables and adapters which enable connection to a network. The wireless connection refers to digital wireless telephony technologies such as Time Division Multiple Access (TDMA), Code Division Multiple Access (CDMA), and Global System for Mobile Communication (GSM), Wi-Fi, Bluetooth, Wide Area Network (WAN) and the like. Further, the network is an internet (worldwide) or intranet (local). The system 100 is characterized by, the processor 122 and the server 124, provides a framework/platform for development, and distribution of solutions related to vehicles. The processor 122 adapted to, render plurality of modules 120 (can also be called as layers) in at least one terminal device 130 based on an access request. The plurality of modules 120 are displayable on a display interface of the at least one terminal device 130. The processor 122 further executes instructions generated from the plurality of modules 120 for development of the solution, where the instructions are generated by a user of the at least one terminal device 130 which is in communication with the server 124. The plurality of modules 120 are accessible through an input unit of the at least one terminal device 130, each of the plurality of modules 120 are usable alone and in combination. The processor 122 stores the developed solutions in the server 124 for distribution. The processor 122 is an integral part of the server 124 or cloud In accordance to an embodiment, the plurality of modules 120 are selected from group comprising a device module 102, a firmware module 104, a data module 106, an analysis module 108, a solution module 110, a display module 112, a digital infrastructure module 114, a engagement module 116 and a business module 118.

The plurality of modules 120 are rendered in a display interface, such as a screen or a touch screen, etc. In other words, the plurality of modules 120 are loaded in the terminal device 130. The access to the plurality of modules 120 is through a web front, or website or portal 132, which is opened in a web browser. Further, the plurality of modules are accessible through a mobile application as well.

The plurality of modules 120 is now explained. The instructions corresponds to commands, logics, programs, action, selection and the like, while using the plurality of modules 120. The device module 102 comprises details of at least one of a device and modules of the device which gathers or generates data required for at least one solution. The device module 102 also provides access to the at least one device or modules of device through a source selected from a proprietary source and an ecommerce source. The device module 102 comprises list and details of devices or modules/components, such as telematics device 134, which generates data relevant for the solution development. The devices and the modules of the devices in the device module 102 are hardware agnostic. The device and/or modules of the device will now be collectively referred to as the device for easy intelligibility.

The firmware module 104 provides access to data required for operation of the at least one device selected from the device module 102 with the vehicle along with the digital infrastructure module 114. The firmware module 104 provides firmware comprising logics, program, or set of instructions for each device in the device module 102. The firmware is either pre-stored or developed in collaboration with users. The firmware enables interfacing and communicating with and between the vehicle and connected infrastructure. The firmware in the firmware module 104 are device agnostic and a server or cloud agnostic.

The data module 106 stores and preprocesses data generated by the at least one device. The data module 106 enables processing the data at the device or for edge computing or processing in the server 124 infrastructure. The data module 106 acts as a "data lake" for the data generated and processed through the data module 106. The data module 106 comprises sub modules in the form of plug-ins/ functions (other forms also possible) such as harmonizer, featuring, optimizer, quantifier etc. Again, the plug-ins are made as per requirements or used from existing list. In case of new data modules 106 is needed, then the framework provides necessary tools to build those as well, without the need for separate installations. The processed data is made available for a user of the terminal device 130 for development of the at least one solution.

The analysis module 108 provides at least one sub-modules for detailed processing of the data received from the data module 106. The at least one sub-module is selected from at least one of Artificial Intelligence (AI), Deep Learning (DL), Machine Learning (ML), Behavioral Science (BS) and the like. The sub modules of the analysis module 108 are created based on domain experience and expertise in the automotive sector. For example, data based engine model to facilitate model based calibration of Internal combustion Engine (ICE), Electric Vehicle (EV), hybrid vehicle for different types of vehicles such as two-wheeler, three-wheeler, four-wheeler, Buses, Trucks, etc., a physics based engine model, fuel combustion models, catalyst model, exhaust model, vehicle driving model, power-train model, energy management model, thermal management model etc.

The solution module 110 is a repository of problems, ongoing solution, and developed solutions. The users comprises developers, programmers, data scientists, engineers, researchers, scholars, an interested party, an organization, etc. The problems are posted and the user either independently or collaboratively, work to provide solution for the problem. The users are free to develop a solution for their specific problem which is not even posted. The developed solutions, problems, and ongoing solutions are available for use or download through the solution module 110. The solutions are provided as mobile applications or set of instructions which are executable by a computer or control unit, controller, etc. The solutions comprises all solutions which relates to the vehicles. One solution is parking of the vehicles, other solution is phone based vehicle diagnostics and the like. The solutions are either executed within the vehicle or by external tools for the vehicles.

The display module 112 provides plurality of tools for development of a User Interface (UI) of the at least one solution, for example, Graphical UI for infotainment unit of the vehicle, interactive UI for a mobile device of a user etc.

The digital infrastructure module 114 provides plurality of sub modules for connectivity needed for secure implementation and deployment of the developed solutions for the vehicle. The digital infrastructure module 114 is the bedrock to facilitate any development on the connected solutions, which defines the standard protocols, security features, payment gateways and many more, apart from being vendor agnostic, server or cloud agnostic The engagement module 116 enables communication, interaction with at least one other user with respect/reference/regards to the device module 102, the firmware module 104, the data module 106, the analysis module 108, the solution module 110, the display module 112, the digital infrastructure module 114, and the business module 118. The engagement module 116 enables a larger community of resources to come together and work on a common cause. The approach can be inside-out (where the talent pool is within an organization) and outside-in (where the scope is beyond the organization which facilitates, academia, partners, start-ups, government etc.) or combination of both.

The business module 118 enables finding of customers and monetization of developed solutions. The business module 118 is the key enabler to generate revenue and develop a pricing strategy and maintain accounting structure, but not limited to the same. The business module 118 provides an online or digital marketplace for enabling business.

According to the present invention, the system 100 is used by at least two users, namely, a solution requester and a solution provider. The solution requester posts a problem using the UI of website or portal 132 which then gets stored in solution module 110, and the solution provider solves the problem using the at least one module 120. The solution provider solves the requested solution by any one of independently and in communication with at least one a second solution provider. The at least two users are selected from at least one of same organization and disparate organization.

An example to understand the working of the present invention is explained. The same must not be understood in limiting manner. Consider an organization with multiple employees or associates under different departments. The solution framework of the present invention is being used in the organization, such as in the form of license, subscription etc. A working group is formed in the organization to solve problem of emission from vehicles. A first member of the working group opens the solution framework on a computer 126, such as laptop, desktop, through a web browser. The first member logs-in to the solution framework using authorization credentials. Once logged-in, the first member posts the problem statement in the solution framework through the UI of website or portal 132 which then gets stored in solution module 110. A second member of the working group logs-in the solution framework using a smart phone 128, either through an application or browser. The second member reads the problem statement, and browses through the device module 102 to select the appropriate device. The second member selects a data logging device which needs to be fit to the vehicle. The data logging device is ordered/bought from the device module 102, after necessary approvals. The data logging device is fit to at least one test vehicle. For the functioning of the data logging device, a third member of the team selects an appropriate firmware, from the firmware module 104, to interface with particular make of the vehicle. If a particular firmware is unavailable, the third member approaches a firmware team within the community through the engagement module 116. Through engagement module 116, the firmware is made and installed in the data logging device to function with the vehicle. Now for several days or months, data is recorded from the vehicle through the data logging device. Now, the third member uses the data module 106 to store and preprocess the recorded data through to understand certain patterns. Now, either the data is processed by available plug-ins or a specific plug-in made by approaching an expert through engagement module 116 (either internal to the organization or external). The processed data is combined with existing engine model, data based statistical model, catalyst model etc. available in the analysis module 108. Finally, a solution of emission prediction and control is developed, which is made available in the solution module 110. A designer is approached by the working group, through the engagement module 116 to design a user interface for the emission prediction. The designer uses the display module 112 for the same. In the meantime, an associate provides a suggestion for additional feature to be added in the emission prediction.

After having developed the emission prediction, the same is tested in a virtual environment within the solution framework, using an exhaust model and catalyst model. The emission prediction is then implemented in the vehicle using one or more sub modules of the digital infrastructure module 114. Further, the concept of emission prediction is monetized by reaching to potential customers through the business module 118. The business module 118 also assists in managing costs associated with the development of the emission prediction as the solution. The emission prediction solution is also made available as an application in the solution module 110 for distribution. Any third party interested in the same solution, pays the required fees and implements in the vehicle. This is just an example, to explain the working of the invention. This is applicable to other numerous types of solutions related to the vehicle using a single solution framework, but not restricted only to the solutions arising from vehicle FIG. 2 illustrates a method for developing and distributing mobility solutions, according to the present invention. The method comprising the steps of, a step 202 comprising establishing a connection between the server 124 and the terminal device 130. A step 204 comprises rendering plurality of modules 120 in the terminal device 130. The plurality of modules 120 accessible by the input unit of the terminal device 130, and each of the plurality of modules 120 are usable alone and in combination. A step 206 comprises, developing solutions relating to vehicles through the plurality of modules 120. A step 208 comprises, storing and distributing the developed solutions through the server 124. The plurality of modules 120 are selected from group comprising the device module 102, the firmware module 104, the data module 106, the analysis module 108, the solution module 110, the display module 112, the digital infrastructure module 114, the engagement module 116 and the business module 118.

The device module 102 enables selecting and accessing, the at least one of the device and the modules of the device, assisting in generating data required for development of at least one solution. The device module 102 enables acquiring of the devices through the source linked with the server 124 selected from a proprietary source and an ecommerce source (third party). The firmware module 104 enables interfacing and communication, of the at least one device selected from the device module 102 with the vehicle and the digital infrastructure module 114.

The data module 106 enables preprocessing, of the raw data generated by the at least one device. The raw data and the preprocessed data are made available for the development of the at least one solution. The analysis module 108, enables selective analyzing of the data received from the at least one of device module 102 and the data module 106. The analysis module 108 is selected from at least one of Artificial Intelligence (AI), Deep Learning (DL), Machine Learning (ML), Behavioral Science (BS) and the like. The solution module 110 provides a repository of at least one problem, a partly solved problem or ongoing solution and developed solutions. The display module 112 enables developing of UIs for the developed solution.

The digital infrastructure module 114 enables implementing and deploying of the developed solutions. The engagement module 116 enables access, connection and communication, for the available/required data, with communities, networks for development of the at least one solution, and the business module 118 enables monetizing the developed solutions.

The method also comprises, accessing the server 124, by at least one solution requester and a solution provider. The solution requester posts a problem using the solution module 110, and the solution provider solves the problem using the plurality of modules 120. The solution provider solves the problem by either independently or in collaboration with at least one a second solution provider.

According to the present invention, the solution framework provides platform of platforms for developing and provisioning solutions through an online application store based portal. The principle difference is in the context of coverage, multiple platforms and the orchestration of various part of the solution framework in the mobility domain of the vehicles. The present invention is an enabler for open source communities to contribute for mobility related problems, and enables small scale companies or start-ups to scale, large scale companies to diversify into platform and solution business in the connected world. The present invention is the building blocks around the connected mobility ecosystem and provides a platform to enable solution development. The idea of the platform is to provide building blocks through each module and hence enable the developers or users who access the framework to build solutions to cater mobility and beyond.

It should be understood that embodiments explained in the description above are only illustrative and do not limit the scope of this invention. Many such embodiments and other modifications and changes in the embodiment explained in the description are envisaged. The scope of the invention is only limited by the scope of the claims.

We claim:
1. A system for collaborative development and distribution of solutions, said system comprising:
a server;
at least one terminal device connectable to said server through at least one of a wired connection and a wireless connection; and
at least one processor configured to establish communication between said server and said at least one terminal device after an authentication, wherein said at least one processor and said server (i) are configured to provide a framework for development and distribution of solutions related to vehicles; and (ii) are adapted to render a plurality of modules in said at least device based on an access request,
wherein said plurality of modules are displayable on a display interface of said at least one terminal device,
wherein said at least one processor and said server are further configured to execute instructions generated from said plurality of modules for (i) retrieval of at least one problem of a plurality of problems from a solution module f said plurality of modules, and (ii) development of said solutions to said retrieved at least one problem, said instructions and said solutions generated by a user of said at least one terminal device which is in communication with said server,
wherein said plurality of modules is accessible through an input unit of said at least one terminal device, each module of said plurality of modules is usable alone and in combination,
wherein said at least one processor and said server are further configured to store said developed solutions in said server for said distribution,
wherein said solution module includes a repository of said plurality of problems, ongoing solutions to said problems of said plurality of problems, and said developed solutions to said problems of said plurality of problems, and
wherein said problems of said plurality of problems are posted to said solution module by said user of said at least one terminal device.

2. The system as claimed in claim 1, wherein said plurality of modules further includes at least one of a device module, a firmware module, a data module, an analysis module, a display module, a digital infrastructure module, an engagement module, and a business module.

3. The system as claimed in claim 2, wherein:
said system is used by a solution requester and a solution provider,
said solution requester posts a problem using an interface,
said solution module stores said problem,
said solution provider solves said problem using said plurality of modules, and
said solution provider solves said problem independently and/or collaboratively with another solution provider.

4. The system as claimed in claim 3, wherein said solution requester and said solution provider are selected from a same organization or disparate organizations.

5. The system as claimed in claim 2, wherein said device module comprises details of at least one of device and modules of said device gathers or generates data required for said at least one solution, said device module provides access to said at least one of said device and modules of said device through a proprietary source or an ecommerce source.

6. The system as claimed in claim 2, wherein said firmware module provides data required for operation of said at least one device selected from said device module with said vehicle and said digital infrastructure module.

7. The system as claimed in claim 2, wherein said data module stores and preprocesses raw data generated by said at least one device, said raw data and preprocessed data are made available for said user of said at least one terminal device for development of said at least one solution.

8. The system as claimed in claim 2, wherein said analysis module provides at least one sub-module detailed processing of said data received from said data module, said at least one sub-module including at least one of Artificial Intelligence (AI), Deep Learning (DL), Machine Learning (ML), and Behavioral Science (BS).

9. The system as claimed in claim 2, wherein said display module provides a plurality of tools for development of a User Interface (UI) of said at least one solution.

10. The system as claimed in claim 2, wherein said digital infrastructure module provides a plurality of sub modules for connectivity needed for secure implementation and deployment of said developed solutions for said vehicle.

11. The system as claimed in claim 2, wherein said engagement module enables communication, interaction with at least one other user with respect to said device module, said firmware module, said data module, said analysis module, said solution module, said display module, said digital infrastructure module, and said business module.

12. The system as claimed in claim 2, wherein said business module enables finding of customers and monetization of developed solutions.

13. A system for collaborative development and distribution of solutions, said system comprising:
a server;
at least one terminal device connectable to said server through at least one of a wired connection and a wireless connection; and
at least one processor configured to establish communication between said server and said at least one terminal device after an authentication, wherein said at least one processor and said server (i) are configured to provide a framework for development and distribution of solutions related to vehicles, and (ii) are adapted to render a plurality of modules in said at least one terminal device based on an access request,
wherein said plurality of modules are displayable on a display interface of said at least one terminal device,
wherein said at least one processor and said server are further configured to execute instructions generated from said plurality of modules for development of said solutions, said instructions generated by a user of said at least one terminal device which is in communication with said server,
wherein said plurality of modules is accessible through an input unit of said at least one terminal device, each module of said plurality of modules is usable alone and in combination, and
wherein said at least one processor and said server are further configured to store said developed solutions in said server for said distribution,
wherein said plurality of modules include at least one of a device module, a firmware module, a data module, an analysis module, a solution module, a display module, a digital infrastructure module, an engagement module, and a business module,
wherein said device module comprises details of at least one of device and modules of said device, said device module gathers or generates data required for said at least one solution, said device module provides access to said at least one of said device and modules of said device through a proprietary source or an ecommerce source,
wherein said firmware module provides data required for operation of said at least one device selected from said device module with said vehicle and said digital infrastructure module,
wherein said data module stores and preprocesses raw data generated by said at least one device, said raw data and preprocessed data are made available for said user of said at least one terminal device for development of said at least one solution,
wherein said analysis module provides at least one sub-module detailed processing of said data received from said data module, said at least one sub-module including at least one of Artificial Intelligence (AI), Deep Learning (DL), Machine Learning (ML), and Behavioral Science (BS),
wherein said solution module includes a repository of problems, ongoing solutions, and developed solutions,
wherein said display module provides a plurality of tools for development of a User Interface (UI) of said at least one solution,
wherein said digital infrastructure module provides a plurality of sub modules for connectivity needed for secure implementation and deployment of said developed solutions for said vehicle,
wherein said engagement module enables communication, interaction with at least one other user with respect to said device module, said firmware module, said data module, said analysis module, said solution module, said display module, said digital infrastructure module, and said business module, and
wherein said business module enables finding of customers and monetization of developed solutions.

14. A method for collaborative development and provisioning of solutions to problems with vehicles, said method comprising:
establishing an electronic data connection between a server and a terminal device after an authentication;

electronically transmitting electronic module data from said server to said terminal device, said electronic module data corresponding to a plurality of modules including a solution module having a repository of a plurality of problems related to vehicles, ongoing solutions to said problems of said plurality of problems, and developed solutions to said problems of said plurality of problems;

rendering said plurality of modules on a display interface of said terminal device, said plurality of modules accessible by an input unit of said terminal device, and each of said plurality of modules is usable alone and in combination, said rendering including rendering at least one problem of said plurality of problems from said solution module;

developing solutions relating to said vehicles through use of said plurality of modules to solve said at least one problem that was rendered;

storing said developed solutions in said server as electronic solution data of said solution module;

electronically distributing said electronic solution data through said server to said vehicles; and implementing said distributed solutions in said vehicles to solve said at least one problem.

15. The method as claimed in claim 14, wherein said plurality of modules include at least one of a device module, a firmware module, a data module, an analysis module, a solution module, a display module, a digital infrastructure module, an engagement module, and a business module.

16. The method as claimed in claim 15, further comprising:

selecting and accessing, through said device module, at least one of a device and modules of said device for generating data required for at least one solution, said device module enables acquiring of said at least one of said device and modules of said device through a proprietary source and/or an ecommerce source linked h said server, enabling interfacing and communication, through said firmware module, of said at least one device selected from said device module with said vehicle and said digital infrastructure module, storing and preprocessing, through said data module, raw data generated by said at least one device, said raw data and processed data available for development of said at least one solution, selectively analyzing, through said analysis module, said data received from at least one of said device module and said data module, said analysis module including at least one of Artificial Intelligence (AI), Deep Learning (DL), Machine Learning (ML), and Behavioral Science (BS), providing, through said solution module, a repository of at least one problem, a partly solved problem and developed solutions, developing, through said display module, User Interfaces (UIs) for said developed solution, implementing and deploying, through said digital infrastructure module, of said developed solutions, accessing, connecting and communicating, through said engagement module, available data, communities, networks for development of said at least one solution, and monetizing, through said business module, said developed solutions.

17. The method as claimed in claim 15, wherein further comprising:

accessing said server by at least one solution requester and a solution provider, said at least one solution requester posts a problem using said solution module, and said solution provider solves said problem using said plurality of modules, wherein said solution provider solves said problem independently and/or collaboratively with at least one second solution provider.

18. The method as claimed in claim 17, wherein said at least one solution requester and said solution provider are from a same organization.

19. The method as claimed in claim 17, wherein said at least one solution requester and said solution provider are from disparate organizations.

\* \* \* \* \*

UNITED STATES PATENT AND TRADEMARK OFFICE
CERTIFICATE OF CORRECTION

PATENT NO. : 11,928,448 B2  
APPLICATION NO. : 17/753124  
DATED : March 12, 2024  
INVENTOR(S) : Prashanth et al.

Page 1 of 1

It is certified that error appears in the above-identified patent and that said Letters Patent is hereby corrected as shown below:

In the Claims

In Claim 1, at Column 6, Line 40: "said at least device" should read --said at least one terminal device--.

In Claim 1, at Column 6, Line 48: "module f said plurality" should read --module of said plurality--.

In Claim 16, at Column 7, Lines 37-38: "linked h said server" should read --linked with said server--.

Signed and Sealed this  
Twenty-first Day of January, 2025

Coke Morgan Stewart  
*Acting Director of the United States Patent and Trademark Office*